(12) United States Patent
Stiehler

(10) Patent No.: US 7,168,865 B2
(45) Date of Patent: Jan. 30, 2007

(54) PREVENTING SHUTTER-REBOUND IN CAMERA

(75) Inventor: Wayne E. Stiehler, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/975,864

(22) Filed: Oct. 28, 2004

(65) Prior Publication Data

US 2006/0093349 A1    May 4, 2006

(51) Int. Cl.
G03B 9/08 (2006.01)
G03B 9/40 (2006.01)

(52) U.S. Cl. ......................... 396/453; 396/454; 396/489

(58) Field of Classification Search ................ 396/453, 396/454, 449, 456, 489
See application file for complete search history.

(56) References Cited

U.S. PATENT DOCUMENTS 2,537,888 A * 1/1951 Fuerst ......................... 396/195
5,136,324 A 8/1992 Tsuboi et al.
5,258,797 A 11/1993 Oyoshi et al.
5,721,995 A 2/1998 Katsura et al.
6,554,502 B2 4/2003 Naganuma
2002/0136555 A1 * 9/2002 Watabe et al. ............... 396/453
2003/0118331 A1 6/2003 Stiehler et al.

* cited by examiner

Primary Examiner—W. B. Perkey
Assistant Examiner—Chia-how Michael Liu
(74) Attorney, Agent, or Firm—Robert Luke Walker

(57) ABSTRACT

A normally closed shutter in a camera has at least one blade that is moved to open and close the shutter. A movable blade-driver in the camera has a supporting connection with a fixed support to support the blade-driver for movement, and has a driving connection with the shutter to drive at least the one blade to open and close the shutter when the driver is moved. A fixed blocking ramp in the way of the blade-driver stops the blade-driver once the blade-driver has moved to drive at least the one blade to close the shutter. The fixed ramp is inclined to urge or cam the blade-driver to create a high friction-type force at the supporting connection that impedes movement of the blade-driver to drive at least the one blade to re-open the shutter, whereby the shutter is prevented from being reopened unintentionally.

16 Claims, 8 Drawing Sheets

PREVENTING SHUTTER-REBOUND IN CAMERA

CROSS REFERENCE TO RELATED APPLICATION

Reference is made to commonly assigned, co-pending application Ser. No. 10/972,806, filed Oct. 25, 2004, entitled SYNCHRONIZING SHUTTER AND FLASH IN CAMERA, in the name of Wayne E. Stiehler.

Reference is made to commonly assigned, co-pending application Ser. No. 10/972,807, filed Oct. 25, 2004, entitled DRIVER FOR OPENING AND CLOSING DUAL-BLADE SHUTTER ADAPTED TO BE RESET WITHOUT RE-OPENING SHUTTER, in the name(s) of Robert Gordon Hills, Michael L. Wirt, and Wayne E. Stiehler.

Reference is made to commonly assigned, co-pending application Ser. No. 10/975,867, filed concurrently herewith, entitled SHUTTER-OPENING/CLOSING AND SHUTTER-FLASH SYNCHRONIZATION DRIVER FOR DUAL-BLADE SHUTTER IN CAMERA, in the name of Wayne E. Stiehler.

FIELD OF THE INVENTION

The invention relates generally to the field of photography and in particular to single-blade and multi-blade shutters in cameras. More specifically, the invention relates to preventing undesirable shutter-rebound or shutter-bounce in a camera that can cause unintended shutter-reopening to re-expose an exposed film frame.

BACKGROUND OF THE INVENTION

Practically every film camera available today has a single-blade or multi-blade shutter. Generally speaking, the shutter opens to uncover an exposure aperture in order to permit ambient light reflected from a subject being photographed to reach a film frame behind the exposure aperture. Then, the shutter closes to recover the exposure aperture in order to end the exposure interval.

Single-Blade Shutters

Typically, inexpensive cameras such as disposable single-use or one-time-use cameras have a single-blade shutter. The shutter blade pivots open and closed to uncover and recover the exposure aperture. To take a picture as in Patent Application Publication US 2003/0118331 A1 published Jun. 26, 2003, a shutter release button is manually depressed. This unlatches a high energy lever, which is pivoted via a high energy spring to impact against (strike) a strike tab upstanding on the shutter blade. The shutter blade in turn is pivoted open to uncover the exposure aperture. Then, once the high energy lever is pivoted beyond the strike tab, a return spring pivots the shutter blade closed to re-cover the exposure aperture.

Dual-Blade Center-Opening Shutters

More complex than a single-blade shutter is a dual-blade center-opening shutter. A dual-blade center-opening shutter is one in which a pair of blades pivot open in opposite directions away from one other to uncover the exposure aperture and return to an overlapping closed relation to re-cover the exposure aperture. As in U.S. Pat. No. 5,136,324 issued Aug. 4, 1992, U.S. Pat. No. 5,258,797 issued Nov. 2, 1993, and U.S. Pat. No. 5,721,995 issued Feb. 24, 1998, individual fixed pivot-support posts project into respective pivot holes in the two blades, and a rotatable or pivotable shutter driver for opening and closing the two blades projects into respective overlapping slots in the two blades. Pivoting of the shutter driver in one direction within the overlapping slots pivots the two blades about the pivot-support posts to open, and pivoting of the shutter driver in an opposite direction within the overlapping slots pivots the two blades about the pivot-support posts to close.

The Problem of Shutter-Rebounding

A shutter-rebound or shutter-bounce phenomenon can occur when closing the single-blade or dual-blade shutter. For example, during closing one or more of the blades may rebound or bounce off a fixed stop with sufficient force to partially reopen the shutter. Partially reopening the shutter can re-expose the last-exposed film frame.

Prior art U.S. Pat. No. 6,554,502 B2 issued Apr. 29, 2003 purports to prevent shutter-rebound in a dual-blade center-opening shutter by adding a fixed inclined surface in the closing region of the blades. During shutter-closing, the speed of movement of the blades is reduced by the frictional drag of the inclined surface to prevent shutter-rebound.

The Cross-Referenced Application

The cross-referenced application discloses a camera that has a single-piece shutter-opening/closing and shutter-flash synchronization driver that translates in one direction to pivot a pair of shutter blades away from one another and simultaneously push a movable switch contact of a normally open shutter-flash synchronization switch to close the switch. Then, the movable switch contact is spring-urged to move the switch contact to reopen the shutter-flash synchronization switch and push the single-piece driver in a reverse direction to move the blades towards one another.

SUMMARY OF THE INVENTION

According to one aspect of the invention a camera comprises:

a normally closed shutter having at least one blade that is moved to open and close the shutter;

a movable driver having a supporting connection with a fixed object to support the driver to move, and having a driving connection with the shutter that drives at least the one blade to open and close the shutter when the driver is moved; and a fixed stop for the driver having a blocking face in the way of the driver to stop the driver once the driver has moved to drive at least the one blade to close the shutter, and being oriented to urge the driver to create a friction-type force at the supporting connection that impedes the driver to move to drive at least the one blade to re-open the shutter, whereby the shutter is prevented from being reopened unintentionally.

According to another aspect of the invention camera capable of preventing shutter-bounce involving a normally closed shutter having at least one blade that is moved to open and close said shutter, comprises:

means for moving a blade-drive post coupled with at least said one blade along a fixed support slot to move at least said one blade open and closed; and means for creating a friction-type relation between said blade-drive post and a peripheral edge of said fixed support slot to impede said blade-drive post from moving along said slot to move at least said one blade to reopen said shutter, whereby shutter-bounce is prevented.

DETAILED DESCRIPTION OF THE INVENTION

The invention is disclosed as preferably being embodied in a one-time-use flash camera. Since the elements of a one-time-use flash camera are generally known, the description that follows is directed mostly to those elements forming part of or cooperating with the invention. It is understood that those elements not disclosed may take various forms known to persons of ordinary skill in the camera arts.

Figure 1:
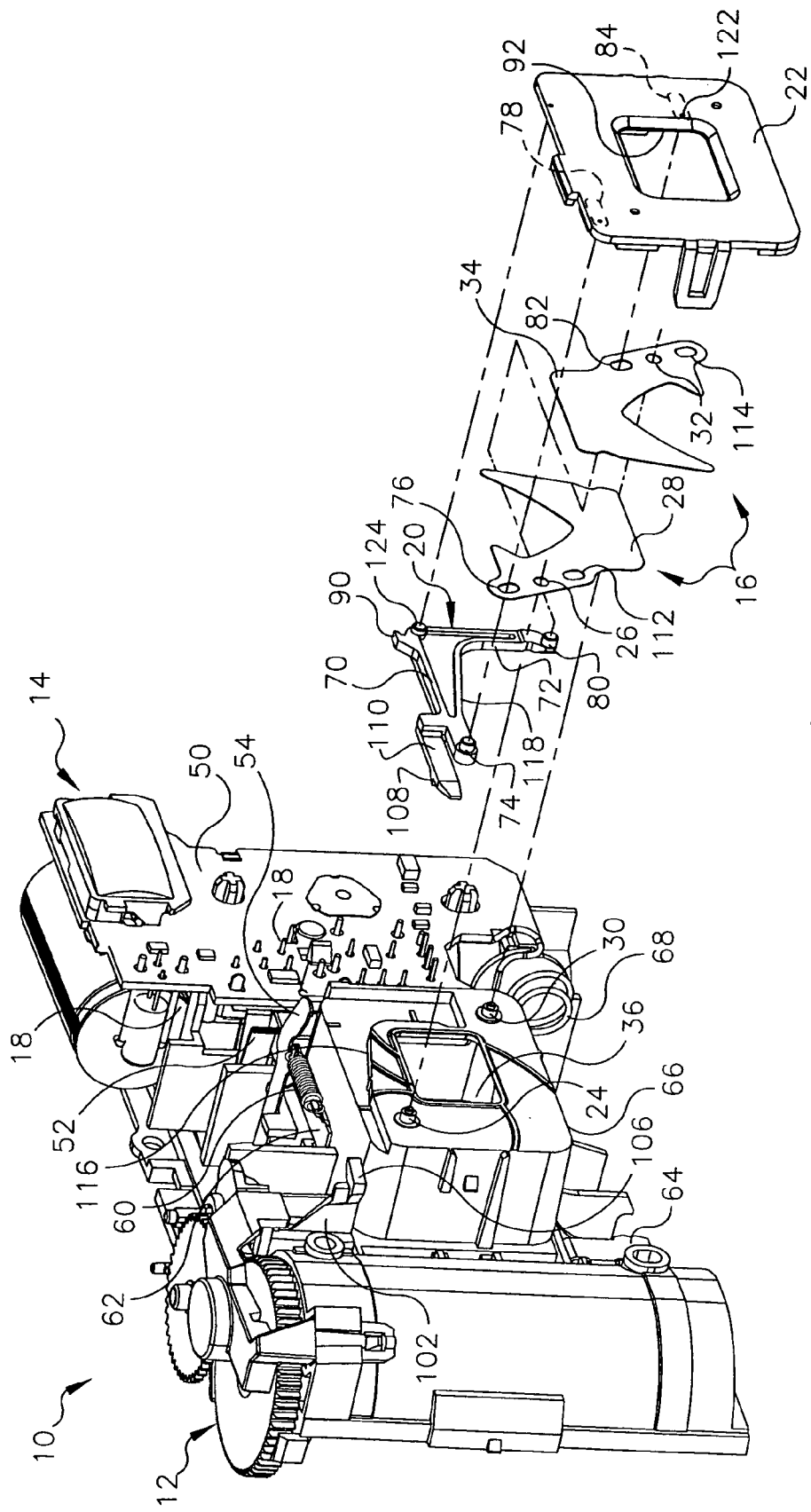
FIG. 1 is an exploded perspective view of a flash camera including a shutter-opening/closing and shutter-flash synchronization driver for a dual-blade center-opening shutter and a shutter-flash synchronization switch, and a fixed ramp for preventing shutter-rebound or shutter-bounce according to a preferred embodiment of the invention.
Figure 9:
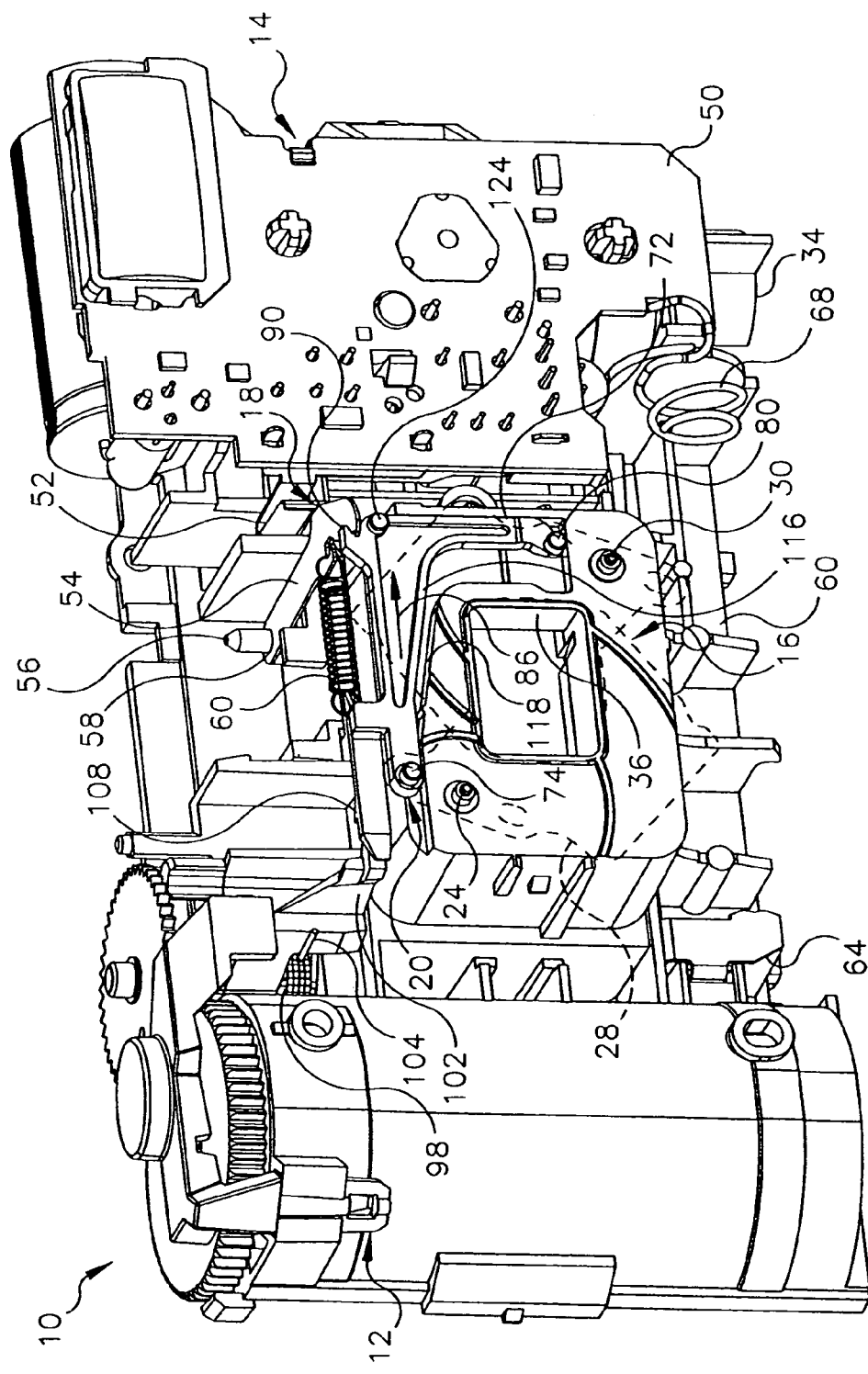
FIG. 9 is an assembled perspective view of the flash camera depicted in FIG. 1, showing the shutter open and the switch closed.
Figure 10:
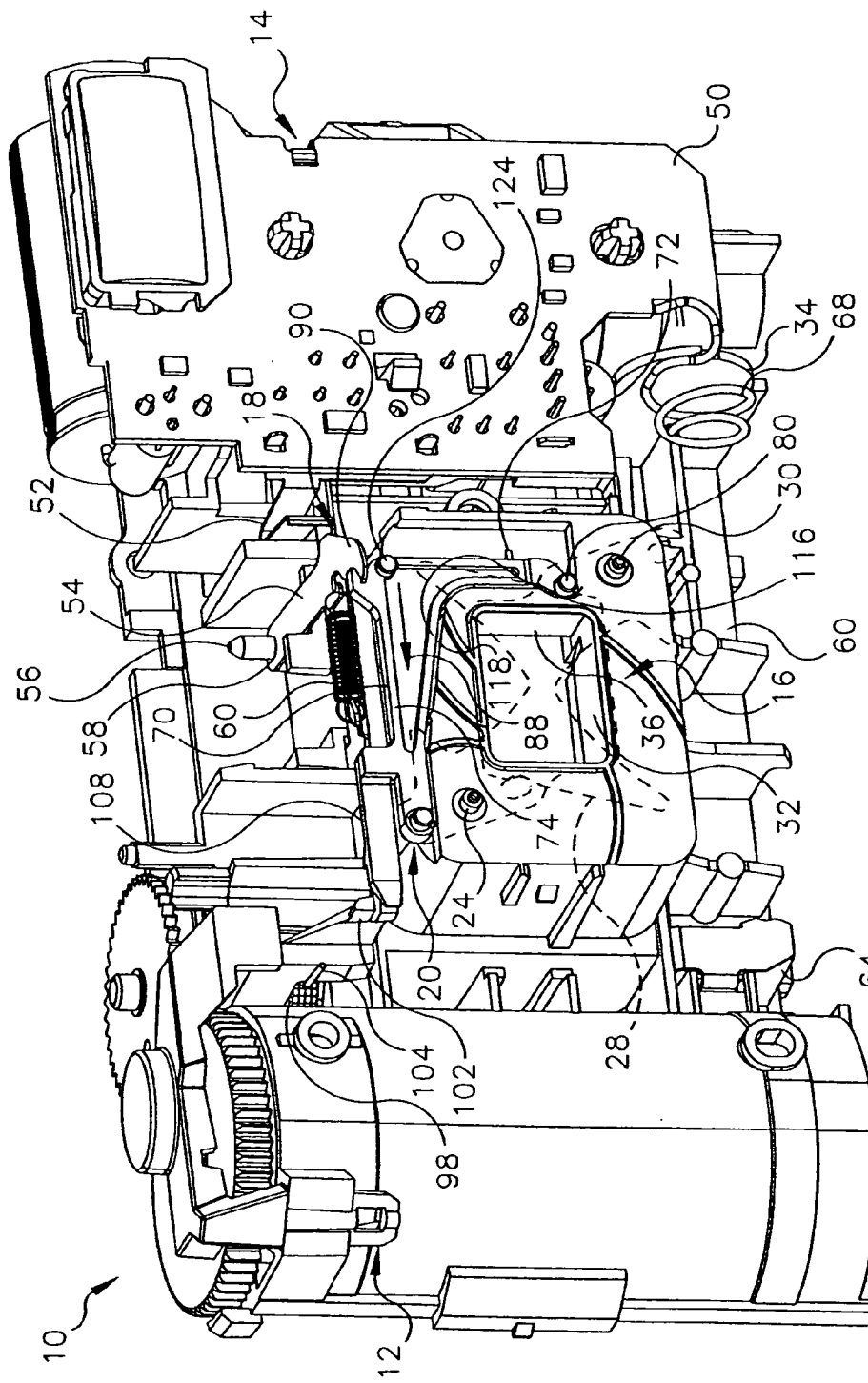
FIG. 10 is an assembled perspective view of the flash camera depicted in FIG. 1, showing the shutter closed and the switch open, and the fixed ramp preventing shutter-rebound or shutter-bounce.

Referring now to the drawings and in particular to FIGS. 1, 9 and 10, there is shown a partially depicted one-time-use camera 10 including a main body part 12, an electronic flash 14, a dual-blade center-opening shutter 16, a normally shutter-flash synchronization switch 18 that is closed to synchronize shutter-opening and flash-firing, an L-shaped driver or slider 20 for opening an closing the dual-blade shutter and for closing the shutter-flash synchronization switch, and a face plate 22.

Figure 3:
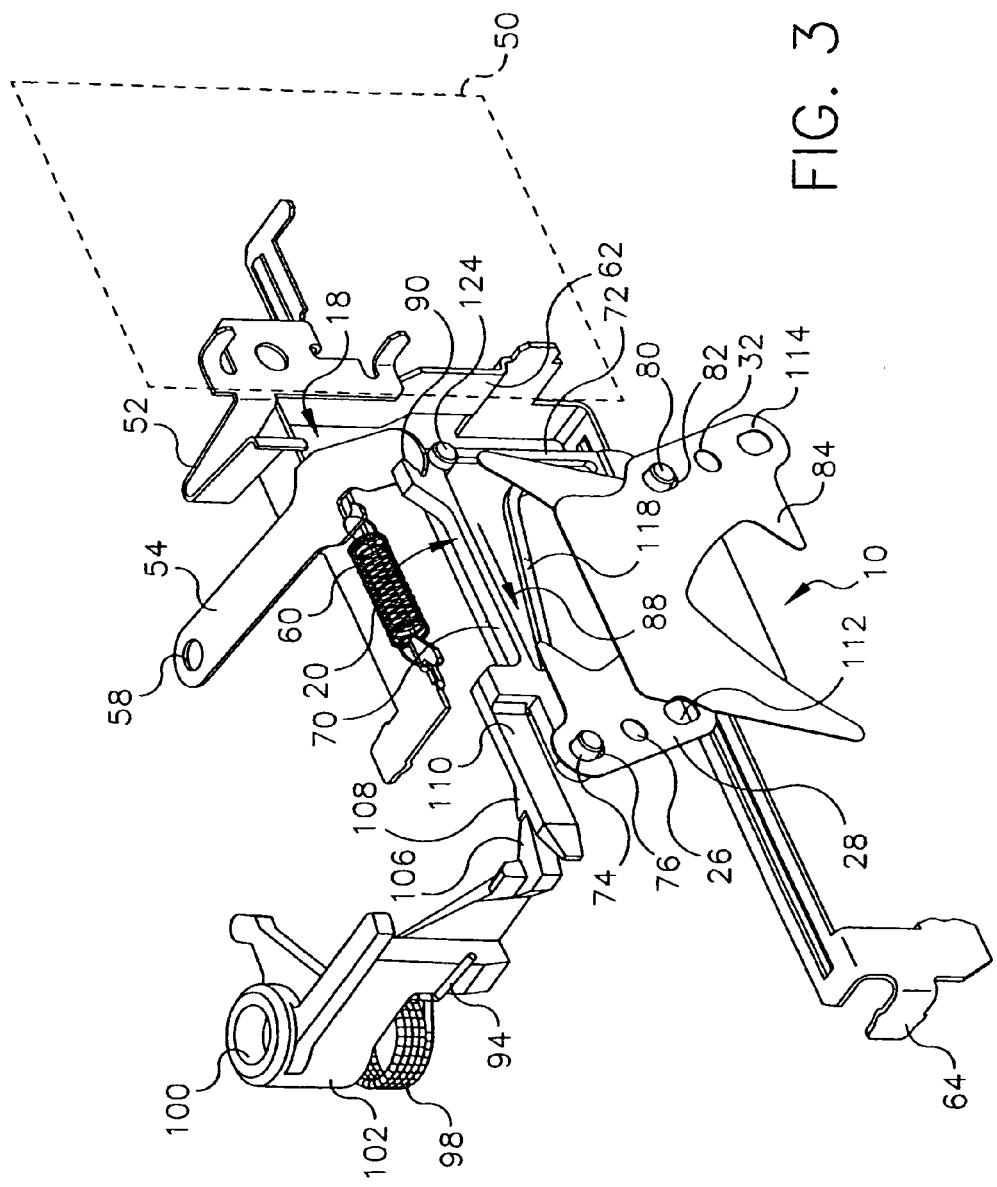
FIG. 3 is an assembled perspective view of the driver, the dual-blade shutter, and the shutter-flash synchronization switch depicted in FIG. 2, showing the shutter closed and the switch open.
Figure 4:
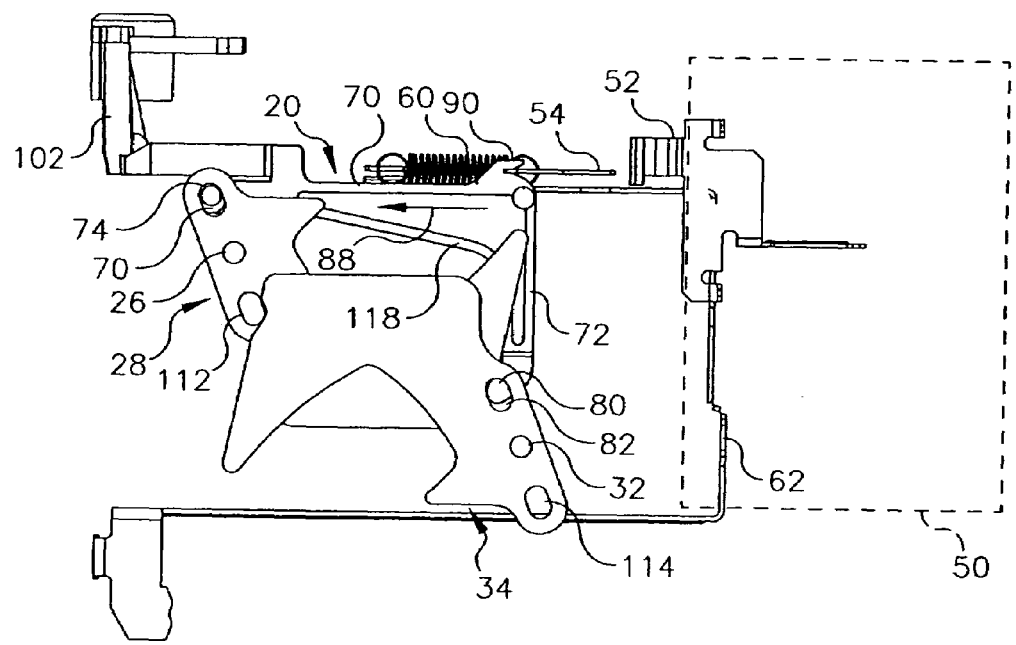
FIG. 4 is a front elevation view similar to FIG. 3.
Figure 5:
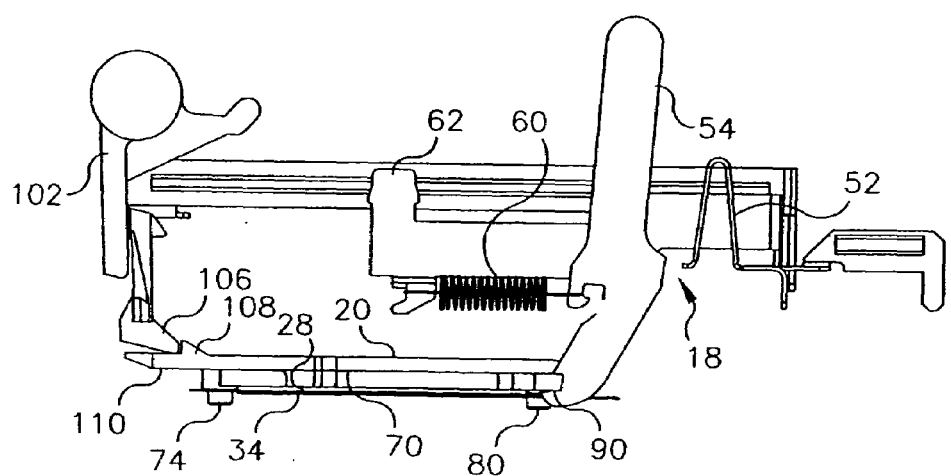
FIG. 5 is a top plan view similar to FIG. 3

As shown in FIGS. 1, 9 and 10, a fixed round pivot-support post 24 on the main body part 12 projects forward into a round pivot hole 26 in a first shutter blade 28 of the dual-blade center-opening shutter 16, and a fixed round pivot-support post 30 on the main body part projects forward into a round pivot hole 32 in a second shutter blade 34 of the dual-blade shutter. The first and second shutter blades 28 and 34 are thin, and are plastic to be electrically non-conductive. The pivot-support posts 24 and 30 support the first and second shutter blades 28 and 34 for opening (parallel-axis) movement away from one another, i.e. clockwise and counter clockwise about the pivot-support posts in FIGS. 6, 7 and 10, to uncover a rectangular exposure aperture 36 in the main body part 12. Also, the pivot-support posts 24 and 30 support the first and second blades 28 and 34 for return or reverse closing (parallel-axis) movement towards one another, i.e. counterclockwise and clockwise about the pivot-support posts in FIGS. 3, 4 and 9, to recover the exposure aperture 36.

Figure 6:
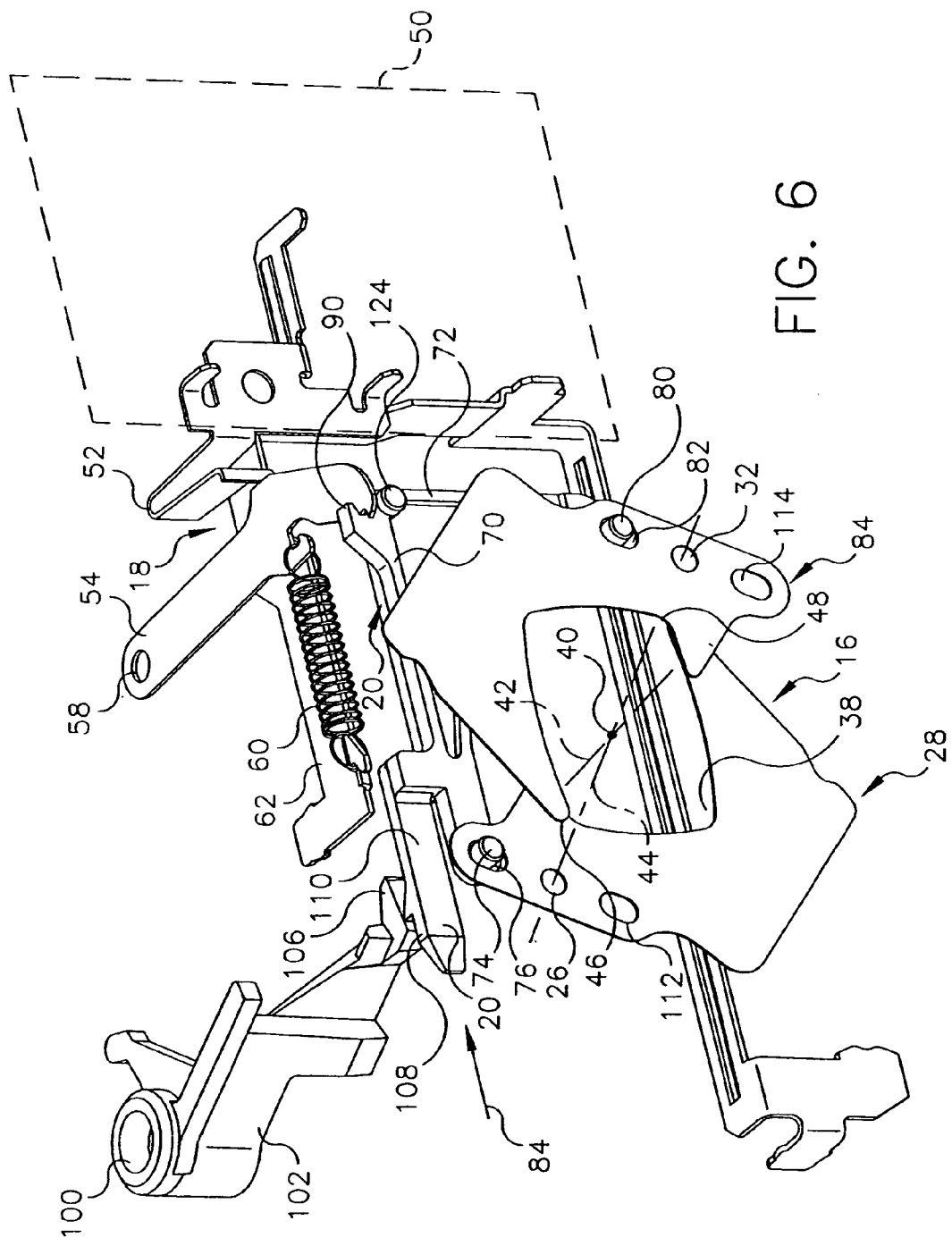
FIG. 6 is an assembled perspective view of the driver, the dual-blade shutter, and the shutter-flash synchronization switch depicted in FIG. 2, showing the shutter open and the switch closed
Figure 7:
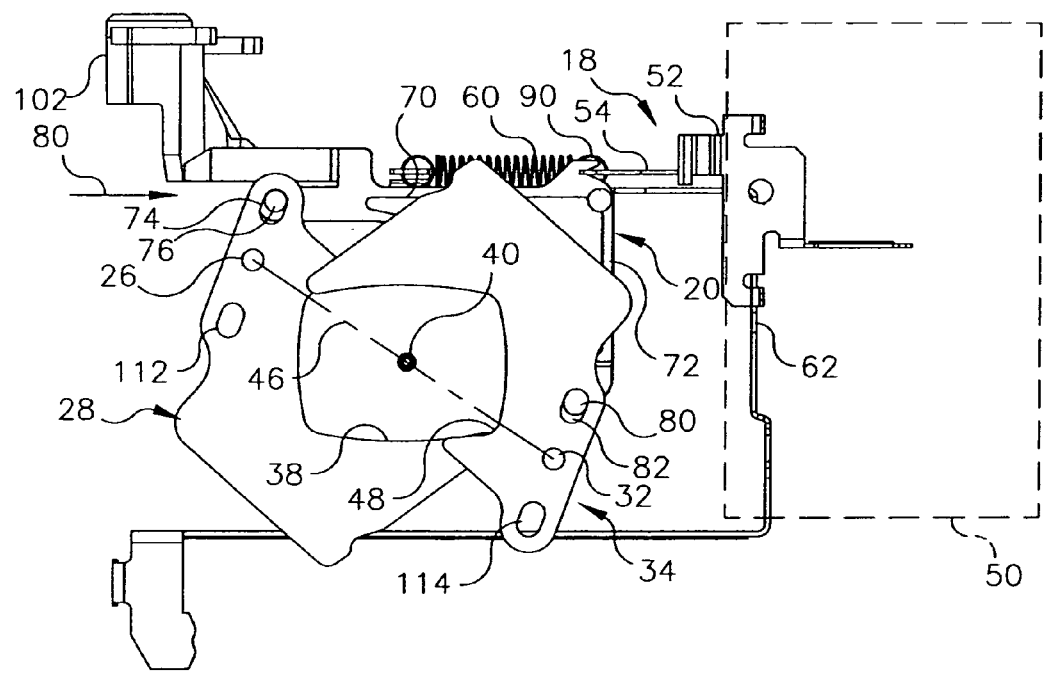
FIG. 7 is a front elevation view similar to FIG. 6.

When the first and second blades 28 and 34 of the dual-blade center-opening shutter 16 are moved away from one another to uncover the exposure aperture 36, they form a substantially rectangular center-opening 38 over the exposure aperture. As shown in FIGS. 6 and 7, the center-opening 38 has a center-point 40 that is aligned with a center-line 42 of the exposure aperture 36. As is known in the prior art, the center-line 42 of the exposure aperture 36 is coincident with an optical axis of a picture-taking lens (not shown). The pivot-support posts 24 and 30 are arranged relative one another and the center-point 40 so that, if a diagonal straight-line 44 is drawn through two opposite corners 46 and 48 of the center-opening 38, the diagonal straight-line would intersect the center-point and the pivot-support posts. In FIGS. 6 and 7, the corners 46 and 48 are located upper-right and lower-left.

As shown in FIGS. 1, 9 and 10, the electronic flash 14 has a flash circuit board 50 for flash-firing when the shutter-flash synchronization switch 18 is closed. The shutter-flash synchronization switch 18 is part of a flash-firing circuit on the flash circuit board 50 and includes a leaf-spring positive switch contact 52 and a movable negative switch contact 54. A fixed round pivot-support post 56 on the main body part 12 projects upward into a round pivot hole 58 in the movable switch contact 54 to support the movable switch contact for pivotable movement, i.e. counterclockwise about the pivot-support post in FIGS. 6-8 and 9, against the leaf-spring switch contact 52 to close the shutter-flash synchronization switch 18, and for return or reverse pivotable movement, i.e. clockwise about the pivot-support post in FIGS. 3-5 and 10, away from the leaf-spring switch contact to reopen the shutter-flash synchronization switch. A metal helical-tension return spring 60 has opposite ends conductively interconnecting the movable switch contact 54 and a fixed thin metal strip 62 mounted on the main body part 12. The return spring 60 urges or biases the movable switch contact 54 away from the leaf-spring switch contact 52 to separate the movable switch contact from the leaf-spring switch contact. The metal strip 62 has one end 64 that protrudes into a battery chamber 66 in the main body part 12 to serve as a negative battery contact. A helical compression spring 68 conductively connected to the flash circuit board 50 protrudes into the battery chamber 66 to serve as a positive battery contact.

Figure 2:
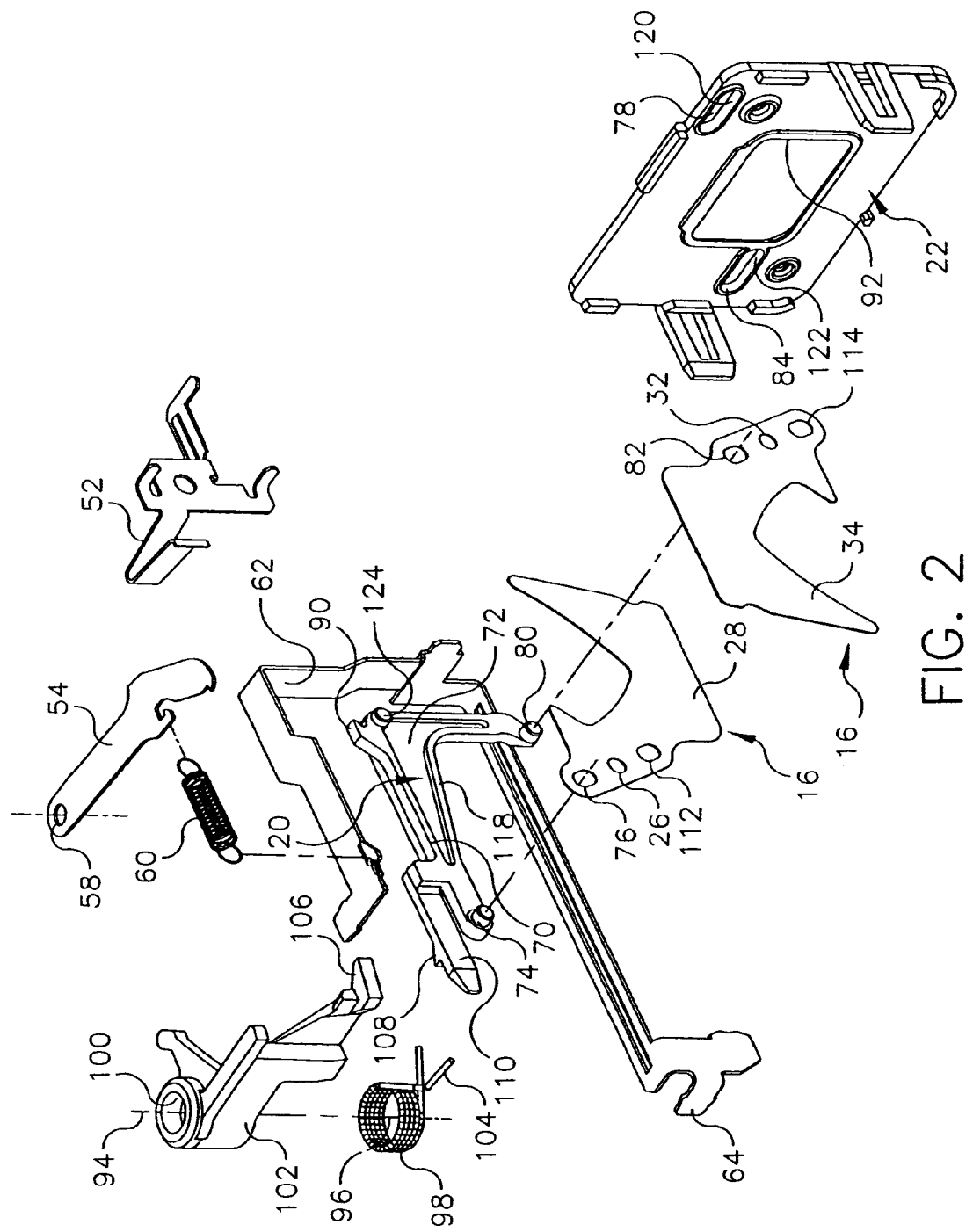
FIG. 2 is an exploded perspective view of the driver, the dual-blade shutter, and the shutter-flash synchronization switch.

The L-shaped driver or slider 20 for opening and closing the dual-blade shutter 16 and for closing the shutter-flash synchronization switch 18 is a single-piece plastic construction and has a pair of substantially right-angle horizontal and vertical driver legs 70 and 72 that essentially provide the L-shape. As shown in FIGS. 1 and 2, the horizontal driver leg 70 has a fixed round blade-drive post 74 that protrudes forward through a elongate drive slot 76 in the first shutter blade 28 and into a straight translation-support slot 78 in the face plate 22, and the vertical driver leg 72 has a fixed round blade-drive post 80 that protrudes forward through an elongate drive slot 82 in the second shutter blade 34 and into a straight translation-support slot 84 in the face plate. The translation-support slots 78 and 84 in the face plate 22 support the L-shaped driver 20 for translation to advance the L-shaped driver in a single forward direction 86, to cause the blade-drive posts 74 and 80 to pivot the first and second shutter blades 28 and 34 away from one another, i.e.

clockwise and counter clockwise about the pivot-support posts 24 and 30 in FIGS. 6, 7 and 10, to uncover the exposure aperture 36. Also, the translation support slots 78 and 84 support the L-shaped driver 20 for translation to return the L-shaped driver in a single reverse direction 88, to cause the blade-drive posts 74 and 80 to pivot the first and second shutter blades 28 and 34 towards one another, i.e. counterclockwise and clockwise about the pivot-support posts in FIGS. 3, 4 and 9, to recover the exposure aperture 36. Thus, the blade-drive post 74 in the drive slot 76 and the blade-drive post 80 in the drive slot 82 are post-in-slot driving connections, and the blade-drive post 74 in the translation-support slot 78 and the blade-drive post 80 in the in the translation-support slot 84 are post-in-slot supporting connections.

When the L-shaped driver 20 is translated in the single forward direction 86, an upstanding switch drive finger 90 on the horizontal driver leg 70 pushes against the movable switch contact 54 (in opposition to the urging of the return spring 60) to pivot the movable switch contact, i.e. counterclockwise about the pivot-support post 56 in FIGS. 6–9, against the leaf-spring switch contact 52 to close the shutter-flash synchronization switch 18. The shutter-flash synchronization switch 18 is closed at the same time that the blade-drive posts 74 and 80 pivot the first and second shutter blades 28 and 34 away from one another to uncover the exposure aperture 36.

Since the return spring 60 urges or biases the movable switch contact 54 to pivot away from the leaf-spring switch contact 52, i.e. clockwise about the pivot-support post 56 in FIGS. 3–5 and 10, to re-close the shutter-flash synchronization switch 18, the return spring pulls the movable switch contact continuously against the switch drive finger 90. This allows the movable switch contact 54, which will be described below, to push against the switch drive finger 90 in order for the movable switch contact to translate the L-shaped driver 20 in the single reverse direction 88, to cause the blade-drive posts 74 and 80 to pivot the first and second shutter blades 28 and 34 towards one another to recover the exposure aperture 36.

The face plate 22 is mounted on the main body part 12 and has a rectangular plate opening 92 that is aligned with the exposure aperture 36. As depicted in FIG. 1, the face plate 22 partially covers the first and second shutter blades 28 and 34.

Shutter-Opening/Closing and Shutter-Flash Synchronization

A fixed round pivot-support post 94 on the main body part 10 projects upward from the main body part 12 in FIG. 1, through a center-coil opening 96 in a high energy spring 98 and into a round pivot hole 100 in a high energy lever 102 in FIG. 2. A horizontal spring leg 104 of the high energy spring 98 urges the high energy lever 102 to pivot or swing counterclockwise about the pivot-support post 94 as in FIGS. 6–9. As is known in the prior art, the high energy lever 102 is normally latched in place in an initial or home position shown in FIGS. 3–5 and 10.

To make an exposure on film, a shutter release button (not shown) is manually depressed to unlatch the high-energy lever 102 as is known in the prior art. The high energy lever 102 is then pivoted counterclockwise about the pivot-support post 94 in FIGS. 6–9, via the horizontal spring leg 104 of the high energy spring 98. A striker finger 106 on the high energy lever 102 swiftly impacts against (strikes) a strike tab 108 on a resilient cantilever beam 110 extending from the horizontal driver leg 70 of the L-shaped driver 20, to quickly translate the L-shaped driver in the single forward direction 86. As a result, the L-shaped driver is advanced to cause the blade-drive posts 74 and 80 to pivot the first and second shutter blades 28 and 34 away from one another, i.e. clockwise and counter clockwise about the pivot-support posts 24 and 30 in FIGS. 6, 7 and 10, to uncover the exposure aperture 36, and to cause the upstanding switch drive finger 90 on the horizontal driver leg 70 to push the movable switch contact 54 (in opposition to the urging of the return spring 60) to pivot the movable switch contact, i.e. counterclockwise about the pivot-support post 56 in FIGS. 6–9, against the leaf-spring switch contact 52 to close the shutter-flash synchronization switch 18. The shutter-flash synchronization switch 18 is closed at the same time that the blade-drive posts 74 and 80 pivot the first and second shutter blades 28 and 34 away from one another to uncover the exposure aperture 36.

Figure 8:
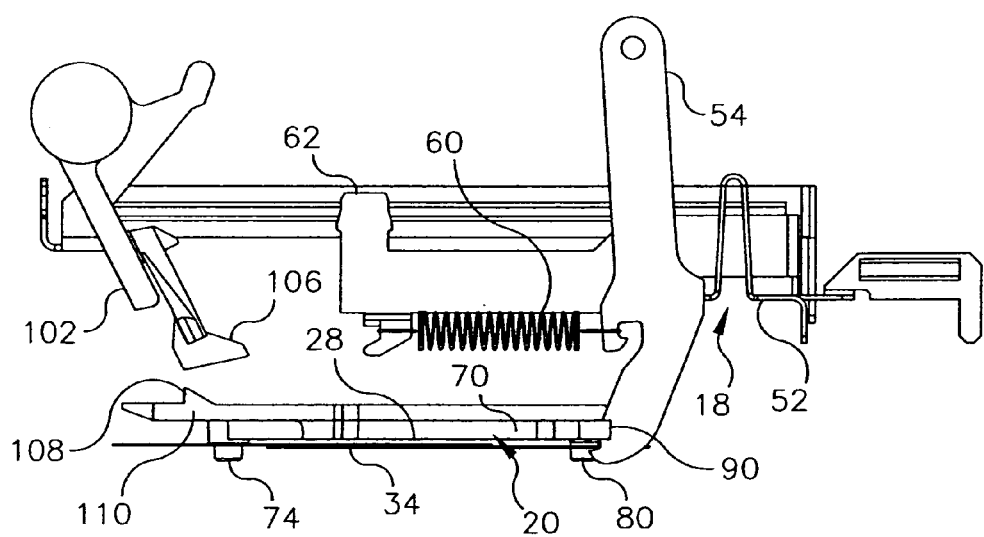
FIG. 8 is a top plan view similar to FIG. 6

As shown in FIGS. 6–8, after the striker finger 106 on the high energy lever 102 strikes the strike tab 108 on the resilient cantilever beam 110, the striker finger swings slightly beyond the strike tab. This allows the return spring 60 to pivot the movable switch contact 54 away from the leaf-spring switch contact 52, i.e. clockwise about the pivot-support post 56 in FIGS. 3–5 and 10, to re-close the shutter-flash synchronization switch 18. The movable switch contact 54 pushes against the switch drive finger 90 on the L-shaped driver 20 to translate the L-shaped driver in the single reverse direction 88, which causes the blade-drive posts 74 and 80 to pivot the first and second shutter blades 28 and 34 towards one another to recover the exposure aperture 36.

Then, as is known in the prior art a metering cam (not shown) is manually rotated during film rewinding to return the high energy lever 102 to its initial or home position by pivoting the high energy lever clockwise about the pivot-support post 94 in FIGS. 3–5 and 10 (in opposition to the urging of the horizontal leg 104 of the high energy spring 98). As the striker finger 106 on the high energy lever 102 is being returned past the strike tab 108 on the resilient cantilever beam 110, the beam is temporarily or momentarily deflected or bent to shift the strike tab out of the way of the striker finger. This is done without moving the L-shaped driver 20. Once the striker finger 106 is returned past the strike tab 108, the resilient cantilever beam 110 elastically straightens.

Interchangeability of the Shutter Blades

The first and second shutter blades 28 and 34 are exactly identical to make them readily interchangeable as shown in FIG. 1, for ease of manufacture of the camera 10. For this purpose, the first blade 28 has an unused drive slot 112 that is aligned with and below the pivot hole 26 and the used drive slot 76 in the first shutter blade, and the second blade 34 has an unused drive slot 114 that is aligned with and below the pivot hole 32 and the used drive slot 82 in the second shutter blade. See FIGS. 1 and 2. The unused drive slots 112 and 114 are spaced the same distance from the pivot holes 26 and 32, as are the used drive slots 76 and 82 spaced from the pivot holes.

Preventing Shutter-Rebound or Shutter-Bounce

As shown in FIGS. 1, 9 and 10, the main body part 12 and the L-shaped driver or slider 20 have parallel similarly-inclined ramp and follower faces 116 and 118. Preferably, the ramp and follower faces 116 and 118 are each flat and are each inclined at an acute angle within the range of 9°–15° (preferably 11.8°). The ramp face 116 serves as a fixed stop for the L-shaped driver 20 in FIG. 10.

When the L-shaped driver 20 is translated in the single reverse direction 88 to cause the blade-drive posts 74 and 80 on the L-shaped driver to pivot the first and second shutter blades 28 and 34 towards one another to recover the exposure aperture 36, the follower face 118 on the L-shaped driver is moved to abut against the ramp face 116 on the main body part 12 as in FIGS. 9–10. The ramp face 116, in cooperation with the follower face 118, stops the L-shaped driver 20 and due to its incline tends to urge or cam or lift the L-shaped driver slightly upward in FIG. 10 to create a high friction-type relation between the blade-drive post 74 on the L-shaped driver and a peripheral edge or surface 120 of the translation-support slot 78 in the face plate 22 and between the blade drive post 80 on the L-shaped driver and a peripheral edge or surface 122 of the translation-support slot 84 in the face plate. The friction-type relation is created because the blade-drive post 74 is urged firmly against the peripheral edge 120 and the blade drive post 80 is urged firmly against the peripheral edge 122. This then acts to impede or retard translation of the L-shaped driver 20 in the single forward direction 86, that would cause the blade-drive posts 74 and 80 to pivot the first and second shutter blades 28 and 34 away from one another to unintentionally uncover the exposure aperture 36. Thus, there can be no shutter-round or shutter-bounce.

The invention has been described in detail with particular reference to certain preferred embodiments thereof, but it will be understood that variations and modifications can be effected within the spirit and scope of the invention. For example, the single-piece driver 20 is shown in FIGS. 1 and 2 with an optional driver-support post 124 that projects forward to rest on the face plate 22. The driver-support post 124 is slightly shorter than the blade-drive posts 74 and 80 on the single-piece driver 20.

The invention claimed is:

1. A camera comprising:
   a normally closed shutter having at least one blade that is moved to open and close said shutter;
   a movable driver having a supporting connection with a fixed object to support said driver to move, and having a driving connection with said shutter that drives at least said one blade to open and close said shutter when said driver is moved; and
   a fixed stop for said driver having a blocking face in the way of said driver to stop said driver once said driver has moved to drive at least said one blade to close said shutter, and being oriented to urge said driver to create a friction-type force at said supporting connection that impedes said driver to move to drive at least said one blade to re-open said shutter, whereby said shutter is prevented from being reopened unintentionally;
   wherein said blocking face is an inclined ramp face.

2. A camera as recited in claim 1 wherein said blocking face is inclined at an acute angle of 90° to 15°.

3. A camera as recited in claim 2 wherein said driver has a follower face that is oriented parallel to said ramp face to be moved against said ramp face to stop said driver and permit said ramp face to urge said driver to create the friction-type force at said supporting connection.

4. A camera comprising:
   a normally closed shutter having at least one blade that is moved to open and close said shutter;
   a movable driver having a supporting connection with a fixed object to support said driver to move, and having a driving connection with said shutter that drives at least said one blade to open and close said shutter when said driver is moved; and
   a fixed stop for said driver having a blocking face in the way of said driver to stop said driver once said driver has moved to drive at least said one blade to close said shutter, and being oriented to urge said driver to create a friction-type force at said supporting connection that impedes said driver to move to drive at least said one blade to re-open said shutter, whereby said shutter is prevented from being reopened unintentionally;
   wherein said driving connection is a post-in-slot connection that includes a drive post on said driver protruding through a drive slot in said one blade to drive said one blade when said driver is moved, and said supporting connection is a post-in-slot connection that includes said drive post protruding from said drive slot in said one blade and into a movement-support slot in a fixed object in order to support said drive post to move along said movement-support slot to move said driver to drive said one blade.

5. A camera as recited in claim 4 wherein said movement-support slot is a straight one to support said drive post to translate along said movement-support slot in order that said driver is translated to drive said one blade.

6. A camera as recited in claim 5 wherein a fixed pivot-support post projects into a pivot hole in said one blade to support said one blade to swing about said pivot-support post when said driver is translated to drive said one blade.

7. A camera comprising:
   a normally closed shutter having at least one blade that is moved to open and close said shutter;
   a blade driver having a post that protrudes into a fixed support slot to support said driver for movement to drive at least said one blade to open and close said shutter, by moving said post along said slot; and
   a fixed ramp face oriented to abut said driver once said driver has moved to drive at least said one blade to close said shutter, and oriented to urge said driver to create a friction-type relation between said post and a peripheral edge of said fixed support slot to impede movement of said driver to drive at least said one blade to re-open said shutter, whereby said shutter is prevented from being reopened unintentionally.

8. A camera as recited in claim 7 wherein said post is coupled with at least said one blade to drive at least said one blade to open and close said shutter.

9. A camera as recited in claim 7 wherein the friction-type relation between said post and said peripheral edge of said fixed support slot is created by said fixed ramp face urging said driver to shift said post firmly against said peripheral edge.

10. A camera comprising:
    a normally closed dual-blade center-opening shutter having a pair of blades that are moved away from one another to open said shutter and towards one another to close said shutter;
    a movable driver having a supporting connection with a fixed object to support said driver to translate forward and rearward, and having a driving connection with said blades that drives said blades to open said shutter when said driver is translated forward and that drives said blades to close said shutter when said driver is translated rearward; and a fixed blocking face oriented to abut said driver to stop said driver once said driver has translated rearward to drive said blades to close said shutter, and oriented to urge said driver to create a friction-type force at said supporting connection that impedes said driver to translate forward to drive said blades to reopen said shutter, whereby said shutter is prevented from being reopened unintentionally;

wherein said fixed blocking face is a flat ramp face that is inclined to tend to urge said driver to create the friction-type force at said supporting connection that impedes said driver to translate forward to drive said blades to reopen said shutter.

11. A camera as recited in claim 10 wherein said driver has a flat follower face that is oriented parallel to said flat ramp face to be moved against said flat ramp face to stop said driver and permit said flat ramp face to tend to urge said driver to create the friction-type force at said supporting connection that impedes said driver to translate forward to drive said blades to reopen said shutter.

12. A camera comprising:

a normally closed dual-blade center-opening shutter having a pair of blades that are moved away from one another to open said shutter and towards one another to close said shutter;

a movable driver having a supporting connection with a fixed object to support said driver to translate forward and rearward, and having a driving connection with said blades that drives said blades to open said shutter when said driver is translated forward and that drives said blades to close said shutter when said driver is translated rearward; and a fixed blocking face oriented to abut said driver to stop said driver once said driver has translated rearward to drive said blades to close said shutter, and oriented to urge said driver to create a friction-type force at said supporting connection that impedes said driver to translate forward to reopen said shutter, whereby said shutter is prevented from being reopened unintentionally;

wherein said driving connection is a posts-in-slots connection that includes respective drive posts on said drivers protruding through drive slots in said blades to drive said blades when said driver is translated forward and rearward, and said supporting connection is a posts-in-slots connection that includes said drive posts protruding from said drive slots in said blades and into respective translation-support slots in a fixed object in order to support said drive posts to translate along said translation-support slots in said fixed object to translate said driver to drive said blades.

13. A camera as recited in claim 12 wherein said fixed object is a face plate that partially covers said blades.

14. A method of preventing shutter-bounce in a camera of the kind including a normally closed shutter having at least one blade that is moved to open and close the shutter, and a blade driver having a supporting connection with a fixed object to support the blade driver to move and a driving connection with the shutter that drives at least the one blade to open and close the shutter when the blade driver is moved, said method comprising:

moving the blade driver against a fixed ramp face once the blade driver has moved to drive at least the one blade to close the shutter; and moving the blade driver on the fixed ramp face to urge the blade driver to create a friction-type force at the supporting connection that impedes the blade driver to move to drive at least the one blade to re-open the shutter.

15. A method of preventing shutter-bounce in a camera of the kind including a normally closed shutter having at least one blade that is moved to open and close the shutter, and a blade driver having a post that protrudes into a fixed support slot to movably support the driver to drive at least the one blade to open and close the shutter, said method comprising:

moving the blade driver against a fixed ramp face once the blade driver has moved to drive at least the one blade to close the shutter; and moving the blade driver on the fixed ramp face to urge the blade driver to create a friction-type relation between the post and a peripheral edge of the fixed support slot to impede movement of the blade driver to drive at least the one blade to reopen the shutter.

16. A camera capable of preventing shutter-bounce involving a normally closed shutter having at least one blade that is moved to open and close said shutter, said camera comprising:

a blade-driver for moving a blade-drive post, connecting said blade-driver and at least said one blade, along a fixed support slot to move at least said one blade open and closed; and a friction creating ramp for creating a friction-type relation between said blade-drive post and a peripheral edge of said fixed support slot to impede said blade-drive post from moving along said slot to move at least said one blade to reopen said shutter, whereby shutter-bounce is prevented.

* * * * *

UNITED STATES PATENT AND TRADEMARK OFFICE
CERTIFICATE OF CORRECTION

PATENT NO. : 7,168,865 B2 Page 1 of 1
APPLICATION NO. : 10/975864
DATED : January 30, 2007
INVENTOR(S) : Wayne E. Stiehler It is certified that error appears in the above-identified patent and that said Letters Patent is hereby corrected as shown below:

Claim 2, Column 7, Line 59   In Claim 2, delete "90°'" and insert -- 9° --, therefor.
Claim 12, Column 9, Line 38  In Claim 12, after "forward to" insert -- drive said blades to --.

Signed and Sealed this

Fourteenth Day of August, 2007

JON W. DUDAS
*Director of the United States Patent and Trademark Office*